April 18, 1950     E. W. COFFEY     2,504,251
DRAFTING-SCALE GUARD
Filed Sept. 25, 1946
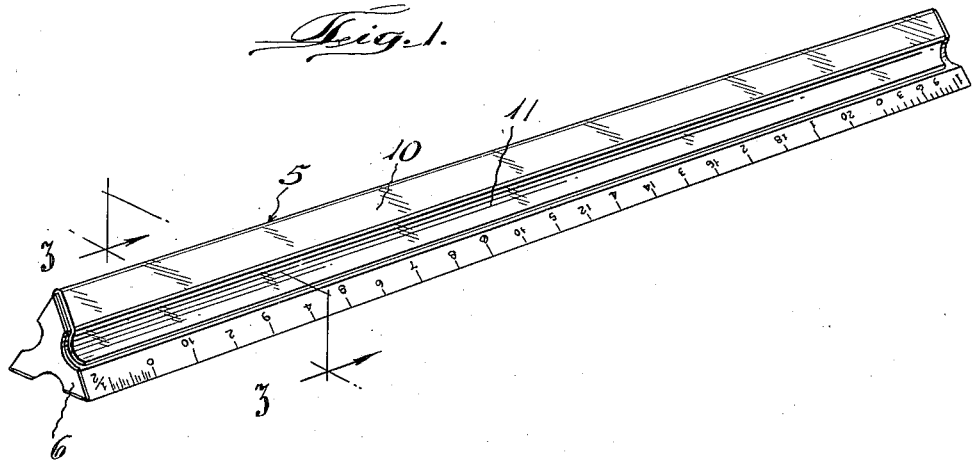
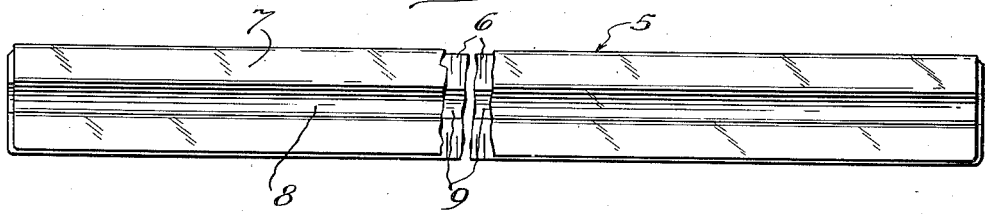
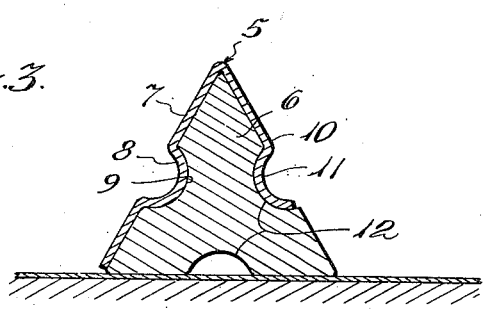
Inventor:
Elmer W. Coffey
By Hinkle, Horton, Ahlberg, Hausmann & Hupper
Attorneys Patented Apr. 18, 1950

2,504,251

UNITED STATES PATENT OFFICE 2,504,251

DRAFTING-SCALE GUARD

Elmer W. Coffey, La Grange, Ill.

Application September 25, 1946, Serial No. 699,110

1 Claim. (Cl. 33—107)

My invention relates to drafting-scale guards. It is particularly intended for use with ordinary so-called triangular scales used extensively by engineering and architectural draftsmen and the like.

The purpose of the invention is to provide a guard which will serve as a guide or guard to indicate instantly, and as it were automatically, the particular edge of the draftsman's scale which the draftsman is using and thereby facilitate his work and avoid accidental use of wrong measurements, while at the same time accurate use of the scale is not interfered with. Guards for this purpose are not new but of those of which I am aware some have projecting parts which are frequently in the way and so detract from the triangular scale appearance that they are, at least psychologically, objectionable. And if the scale be dropped or hurriedly handled, these prior guards may become detached, necessitating that the draftsman again check for the measurement edge he was last using and then reapply the guard. Other guards have a part which, when the scale is in use, lies between the scale and the work thereby preventing the scale, and particularly the measurement indicia edge being used, from lying intimately against the work so that measurements may be accurately taken and made.

One of the objects of my invention is to provide a guard which has no projecting or movable parts or parts interposed between the scale and work, and which when applied, preserves the usually relatively smooth surfaced appearance of the scale without a guard.

Another object is to provide a guard which cannot be easily displaced by accident or inadvertence.

A further object is to provide a guard which lends itself admirably to production in attractive Celluloid or other plastic forms.

A further object is to provide a guard which will serve as a measure of protection to the sharp measurement indicating edges of a triangular scale.

Other objects and advantages will hereinafter appear.

In the accompanying drawing:

Fig. 1 is a perspective of a triangular draftsman's scale of the most common form with the guard in place, the uncovered edge in use being toward the front;

Fig. 2 is a rear elevation of the scale and its guard; and

Fig. 3 is a section on the line 3—3 of Fig. 1.

My guard comprises an elongated two sided body 5 substantially the same length as the draftsman's scale 6 (or at least substantially the length of the measurement indicia bearing portions thereof), and of a cross sectional shape to fit over an angle of the scale. One side 7 of the guard body is substantially the same height as one of the faces of the scale and is provided with a longitudinally inturned bead or corrugation 8 shaped to conform to and fit into the longitudinal finger groove 9 of the scale face.

The other side 10 of the guard body is made narrower than a face of the scale and it too is provided with a longitudinal inturned bead or corrugation 11 shaped to conform to and fit into the longitudinal finger groove 12 of either face of the scale angularly related to the face covered by the guard side 7. Since the measurement indicia upon the faces of many scales extend inwardly from one or more of the angles or corners almost if not quite to the nearest edges of the finger grooves therein, the height of the short side 10 of the guard may well be such as to cause the outer or lower edge of its bead to terminate at or just short of the far edge of the groove in the corresponding scale face as clearly shown in Figs. 1 and 3.

The angle between the sides 7 and 10 of the scale guard should be substantially the same as the angles between the faces of the scale with which the guard is to be used, and the guard should fit the scale tightly enough so that when it has been applied to the scale, preferably by sliding it endwise upon the scale, it will grip with sufficient tightness as not to be readily displaced; and yet not too tight to prevent deliberate removal and application. Preferably in the accomplishment of this end the material of which the guard is made should be somewhat resilient.

In use the draftsman, after deciding the measurement edge of the scale he wishes to use, applies the the guard thereto in such a way that the short side 10 covers the upper portion of that face of the scale leaving exposed the measurement edge the draftsman desires to use, whereas the long face 7 of the scale completely covers the opposite upstanding face of the scale. Thus one face of the scale, which forms the bottom in use, is left entirely uncovered so that it may be placed flat and directly upon the paper or other object to be measured; the upstanding face not being used is completely covered; and the upstanding face the draftsman is transiently using has its measurement indicia only uncovered. The draftsman therefore is always apprized that the measurement indicia he is using are those along the edge below the short face 10 of the guard—i. e., the indicia along the edge or corner of the scale side partly covered by the guard. And the angle or edge bearing the measurement indicia which is in use is directly against the work so that measurements may be taken or laid out with great accuracy. Even a small separation or gap between the indicia bearing edge and the work is undesirable when close measurements are being taken or made.

My guard readily lends itself to production in metal, such for example, as aluminum, or in Celluloid or other plastic material. If desired it may be colored—preferably it should be opaque or translucent so that scale indicia will not show therethrough—to improve its appearance and lend a greater contrast to whatever color the scale may be, in order to facilitate the draftman's almost automatic selection of the scale he has been using. The scale, when the guard is attached, has substantially the appearance of an unguarded scale—as a matter of fact its appearance may be improved by the use of a colored guard—there are no projecting parts to interfere with its ready use or to distract the attention of the draftsman when he has occasion to pick up the scale during its use. The guard, covering as it does almost completely one of the angles of the scale, serves in some measure as a protection for the sharp measurement indicating edges. At all times at least one-third of the scale edges is thus protected against scarring from being dropped or struck against hard objects.

Ordinarily the edges of draftsman's scales are not used as drawing edges because of the wear which would occur from sliding a pen or pencil therealong. However, by the use of my guard its angular edge—that is, the edge of the angle between the sides 7 and 10—may, because it is relatively sharp and smooth, be used as a drawing edge for guiding the draftsman's pen or pencil without any danger of wearing the edge of the scale.

Although shown and described in conjunction with a draftsman's scale of the more common type having flat faces provided with longitudinal finger grooves or corrugations midway the edges, my guard also lends itself to scales of other shape, such, for example, as the rather common so-called "concave scale."

Having thus illustrated and explained the nature and an embodiment of my invention, what I claim and desire to secure by United States Letters Patent is as follows:

A guard for a draftsman's triangular scale having three faces at equal angles to each other with each face bearing a pair of measurement indicia separated by a centrally located longitudinal finger groove, said guard comprising an integral sheet-like body having only two sides which are angularly related to each other at an angle conforming substantially to the angles between two indicia-bearing faces of said scale and intersecting substantially at the line of intersection of the planes of two scale faces to fit over an angle of the scale, said guard being of a length substantially equal to the length of a scale face, one side of said guard having a width substantially equal to the width of a scale face and central longitudinal groove for engaging the finger groove of a scale face, the other side of the guard having a width approximately half the width of a scale face and terminating in an inturned edge for engaging the finger groove of another scale face, said guard exposing the lower indicia on said second-named face, the third scale face being completely exposed for direct engagement with a piece of work to be measured whereby the exposed indicia on said second-named face is immediately adjacent said piece of work.

ELMER W. COFFEY.

REFERENCES CITED

The following references are of record in the file of this patent:

UNITED STATES PATENTS

| Number | Name | Date |
|---|---|---|
| 146,673 | Haslett | Jan. 20, 1874 |
| 1,091,946 | Russo | Mar. 24, 1914 |

FOREIGN PATENTS

| Number | Country | Date |
|---|---|---|
| 121,946 | Austria | Mar. 25, 1931 |